US012650146B2

(12) United States Patent
Sato et al.

(10) Patent No.: US 12,650,146 B2
(45) Date of Patent: Jun. 9, 2026

(54) SLIDING MEMBER, BEARING, SLIDING MEMBER MANUFACTURING METHOD, AND BEARING MANUFACTURING METHOD

(71) Applicant: SENJU METAL INDUSTRY CO., LTD., Tokyo (JP)

(72) Inventors: Naoki Sato, Tokyo (JP); Toshio Hakuto, Tokyo (JP); Takashi Akagawa, Tokyo (JP); Yuji Kawamata, Tokyo (JP); Ryoichi Suzuki, Tokyo (JP); Takashi Saito, Aichi (JP); Tadashi Oshima, Aichi (JP); Hajime Kato, Aichi (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/671,068

(22) Filed: May 22, 2024

(65) Prior Publication Data

US 2024/0309913 A1     Sep. 19, 2024

Related U.S. Application Data

(62) Division of application No. 18/269,152, filed as application No. PCT/JP2021/040203 on Nov. 1, 2021, now Pat. No. 12,031,579.

(30) Foreign Application Priority Data

Dec. 25, 2020     (JP) ................................. 2020-217735

(51) Int. Cl.
| | |
|---|---|
| *F16C 33/12* | (2006.01) |
| *B22F 1/00* | (2022.01) |
| *B22F 7/04* | (2006.01) |

(52) U.S. Cl.
CPC .............. *F16C 33/125* (2013.01); *B22F 1/09* (2022.01); *B22F 7/04* (2013.01); *F16C 2204/12* (2013.01);
(Continued)

(58) Field of Classification Search
CPC ................ F16C 33/125; F16C 2204/12; F16C 2220/20; F16C 2223/80; F16C 33/1095;
(Continued)

(56) References Cited

U.S. PATENT DOCUMENTS

| | | | |
|---|---|---|---|
| 5,843,243 A | | 12/1998 | Kawasaki et al. |
| 6,039,785 A | * | 3/2000 | Dalal .................. C22C 32/0021 |
| | | | 75/235 |

(Continued)

FOREIGN PATENT DOCUMENTS

| | | |
|---|---|---|
| CN | 1143685 | 2/1997 |
| CN | 1930315 | 3/2007 |

(Continued)

OTHER PUBLICATIONS

Extended European Search Report issued May 24, 2024 in European Patent Application No. 21909965.2.
(Continued)

*Primary Examiner* — John A Hevey
(74) *Attorney, Agent, or Firm* — Wenderoth, Lind & Ponack, L.L.P.

(57)     ABSTRACT

A sliding member includes a metal substrate and a sliding layer formed on one surface of the metal substrate. The sliding layer has a matrix phase containing Cu and Sn and hard particles dispersed in the matrix phase and containing a Laves phase constituted of a composition of Co, Mo and Si.

2 Claims, 6 Drawing Sheets

1

(52) U.S. Cl.
CPC ...... *F16C 2220/20* (2013.01); *F16C 2223/80*
(2013.01)

(58) Field of Classification Search
CPC .............. F16C 2204/34; F16C 2300/22; F16C
33/121; F16C 33/124; F16C 33/128;
F16C 33/145; F16C 17/02; B22F 1/09;
B22F 7/04; B22F 2998/10; B22F 3/18;
B22F 5/006; B22F 5/106; B22F 3/1003;
C22C 1/0425; C22C 1/05; C22C 9/00;
C22C 9/02; C22C 9/06
See application file for complete search history.

(56) References Cited

U.S. PATENT DOCUMENTS

| | | | |
|---|---|---|---|
| 2002/0155957 A1 | 10/2002 | Danly, Sr. et al. | |
| 2003/0068106 A1 | 4/2003 | Greene et al. | |
| 2005/0142026 A1 | 6/2005 | Wu | |
| 2007/0065331 A1 | 3/2007 | Kawasaki et al. | |
| 2007/0125458 A1* | 6/2007 | Kawasaki | C22C 9/06 |
| | | | 148/414 |
| 2008/0020215 A1 | 1/2008 | Nakamura et al. | |
| 2009/0123690 A1* | 5/2009 | Scholl | C22C 33/0207 |
| | | | 428/97 |
| 2012/0114971 A1 | 5/2012 | Andler et al. | |
| 2012/0251375 A1 | 10/2012 | Yokota et al. | |
| 2012/0288399 A1* | 11/2012 | Imaizumi | C22C 1/0433 |
| | | | 420/583 |
| 2016/0102386 A1 | 4/2016 | Schmitt et al. | |
| 2017/0253950 A1* | 9/2017 | Shinohara | F01L 3/04 |
| 2020/0132117 A1 | 4/2020 | Toda | |
| 2021/0040989 A1 | 2/2021 | Tanabe et al. | |

FOREIGN PATENT DOCUMENTS

| | | |
|---|---|---|
| CN | 102773627 | 11/2012 |
| CN | 105209646 | 12/2015 |
| CN | 107151751 | 9/2017 |
| CN | 109790598 | 5/2019 |
| EP | 3 521 464 | 8/2019 |
| GB | 2 355 016 | 4/2001 |
| GB | 2489601 | 10/2012 |
| JP | 4-145225 | 5/1992 |
| JP | 5-140678 | 6/1993 |
| JP | 10-330868 | 12/1998 |
| JP | 11-36037 | 2/1999 |
| JP | 2001-81523 | 3/2001 |
| JP | 2001-105177 | 4/2001 |
| JP | 2005-163074 | 6/2005 |
| JP | 2006-316302 | 11/2006 |
| JP | 2008-50688 | 3/2008 |
| JP | 2010-261077 | 11/2010 |
| JP | 2012-207277 | 10/2012 |
| JP | 2017-82328 | 5/2017 |
| JP | 6256569 | 1/2018 |
| JP | 2018-071710 | 5/2018 |
| JP | 2019-123898 | 7/2019 |
| JP | 2019-131834 | 8/2019 |
| WO | 2010/147139 | 12/2010 |
| WO | 2017/029801 | 2/2017 |
| WO | 2018/061333 | 4/2018 |

OTHER PUBLICATIONS

Notice of Reasons for Refusal issued Mar. 24, 2021 in Japanese Patent Application No. 2020-217735, with English-language translation.

Decision to Grant a Patent issued Jul. 29, 2021 in Japanese Patent Application No. 202-217735, with English-language translation.

International Search Report issued Jan. 11, 2022 in International (PCT) Application No. PCT/JP2021/040203.

* cited by examiner

<u>1</u>

3

2

<u>3</u>

12

11

10

13

SLIDING MEMBER, BEARING, SLIDING MEMBER MANUFACTURING METHOD, AND BEARING MANUFACTURING METHOD

CROSS-REFERENCE TO RELATED APPLICATIONS

This application is a divisional of U.S. application Ser. No. 18/269,152 filed Jun. 22, 2023, which is a national stage application of International Application No. PCT/JP2021/040203 filed Nov. 1, 2021, which claims priority to Japanese Patent Application No. 2020-217735 filed Dec. 25, 2020, the entire contents of which are incorporated herein by reference.

TECHNICAL FIELD

The present disclosure relates to a sliding member, a bearing, a method for manufacturing the sliding member, and a method for manufacturing a bearing.

BACKGROUND ART

A lead bronze-based sintered bearing alloy is widely used as sliding members for cars and general industrial machines. Main ingredients of lead bronze are Cu, Sn, and Pb, and the lead bronze-based sintered bearing alloy is prescribed as a copper alloy casting in JIS H5120 and the like. Examples of uses of a copper alloy prescribed as CAC603 (hereinafter referred to as LBC3) among these include bearings for medium and high speeds and high loads and bearings for large-sized engines. Lead contained in this copper alloy at around 10% by mass takes a role in improving friction characteristics as a solid lubricant. When lead, which is a soft metal, easily deforms plastically, lead functions as a lubricant between two surfaces rubbed together, and the copper alloy is consequently a material excellent in friction characteristics.

However, LBC3, which is a general-purpose item, is markedly abraded or seized in a use environment such as insufficient boundary lubrication due to an increase in speed or the load. Improvement therein is an object.

Japanese Patent Publication No. 2008-50688 and Japanese Patent Publication No. 2005-163074 propose a copper-based sliding material of a Cu—Sn—Bi alloy, which has Cu as the main ingredient and to which Sn and Bi are added to the Cu base, as a sliding material containing no lead.

SUMMARY OF INVENTION

It has been desired to provide a sliding member and a bearing in which abrasion resistance is improved as compared with LBC3.

A sliding member according to one embodiment comprises a metal substrate, and a sliding layer formed on one surface of the metal substrate, wherein the sliding layer has a matrix phase comprising Cu and Sn, and hard particles dispersed in the matrix phase and comprising a Laves phase constituted of a composition of Co, Mo and Si.

DESCRIPTION OF EMBODIMENTS

Figure 1:
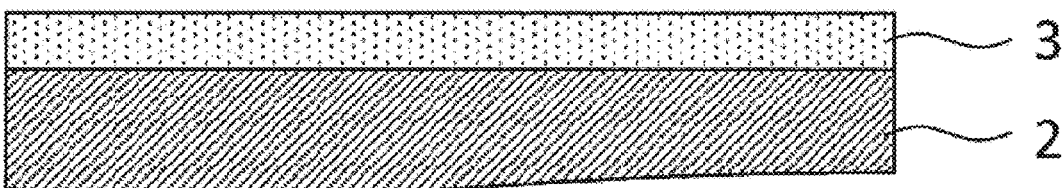
FIG. 1 is a longitudinal section showing a schematic configuration of a sliding member according to one embodiment.

"%" with respect to compositions used herein is "% by mass" unless otherwise specified. "A to B" (both A and B are numbers) used herein means "A or more and B or less" unless otherwise specified. The "main ingredient" used herein refers to a component contained at 50% by mass or more with respect to the whole composition. "Hard particle powder" used herein refers to powder before sintering, and "hard particles" refer to particles in a sliding layer after the sintering. Since Cu and Sn contained in the hard particle powder move into a matrix during the sintering to some extent as described below, the content of the hard particles in a sliding layer varies from the amount of hard particle powder blended in the mixed powder, and the contents of constituent elements in the hard particles are different from the contents of constituent elements in the hard particle powder (the hard particles are particles having a composition in which the contents of Sn and Cu among the chemical components decrease to some extent as compared with the hard particle powder).

A sliding member according to a first aspect of an embodiment comprises a metal substrate and a sliding layer formed on one surface of the metal substrate, and the sliding layer has a matrix phase containing Cu and Sn and hard particles dispersed in the matrix phase and containing a Laves phase constituted of a composition of Co, Mo and Si.

A sliding member according to a second aspect of an embodiment is the sliding member according to the first aspect, wherein the sliding layer further has compound phases dispersed in the matrix phase and containing Co, Fe, Ni, Si, and Cr.

A sliding member according to a third aspect of an embodiment is the sliding member according to the second aspect, wherein the sliding layer further has Bi particles dispersed in the matrix phase.

A sliding member according to a fourth aspect of an embodiment is the sliding member according to any aspect of the first to third aspects, wherein the content of the hard particles is 40% by mass or less per 100% by mass of the whole sliding layer.

A bearing according to a fifth aspect of an embodiment comprises a metal substrate, and a sliding layer formed on one surface of the metal substrate, wherein the bearing is constituted in an annular shape with the sliding layer on an inside, and a cylindrical inner peripheral surface is constituted of the sliding layer, wherein the sliding layer has a matrix phase containing Cu and Sn, and hard particles dispersed in the matrix phase and containing a Laves phase constituted of a composition of Co, Mo and Si.

A method for manufacturing a sliding member according to a sixth aspect of an embodiment has a step of sprinkling a mixed powder on one surface of a metal substrate, the mixed powder having a first powder containing Cu, Sn, and Bi and a hard particle powder containing a Laves phase constituted of a composition of Co, Mo, and Si and containing Cu, Si, Fe, Mo, Co, and Cr, and a step of sintering the mixed powder sprinkled on the metal substrate at 800 to 900° C.

A method for manufacturing a sliding member according to a seventh aspect of an embodiment is the method for manufacturing a sliding member according to the sixth aspect, wherein the hard particle powder further contains Sn.

A method for manufacturing a sliding member according to an eighth aspect of an embodiment is the method for manufacturing a sliding member according to the seventh aspect, wherein the hard particle powder contains Sn at 1% by mass or more.

A method for manufacturing a sliding member according to a ninth aspect of an embodiment is the method for manufacturing a sliding member according to any aspect of the sixth to eighth aspects, wherein the amount of the hard particle powder blended is 1 to 40% by mass per 100% by mass of the whole mixed powder.

A method for manufacturing a sliding member according to a tenth aspect of an embodiment is the method for manufacturing a sliding member according to any aspect of the sixth to ninth aspects, wherein the mixed powder further has a second powder containing Cu, Co, Fe, Ni, Si, and Cr.

A method for manufacturing a sliding member according to the eleventh aspect of an embodiment is the method for manufacturing a sliding member according to the tenth aspect, wherein the second powder further contains Sn.

A method for manufacturing a sliding member according to a twelfth aspect of an embodiment is the method for manufacturing a sliding member according to the eleventh aspect, wherein the second powder contains Sn at 1% by mass or more.

A method for manufacturing a sliding member according to a thirteenth aspect of an embodiment is the method for manufacturing a sliding member according to any aspect of the tenth to twelfth aspects, wherein the amount of the second powder blended is 2 to 38% by mass per 100% by mass of the whole mixed powder.

A method for manufacturing a sliding member according to a fourteenth aspect of an embodiment is the method for manufacturing a sliding member according to any aspect of the tenth to thirteenth aspects, wherein the amount of the hard particle powder blended is 1 to 40% by mass, and the amount of the second powder blended is 2 to 38% by mass, per 100% by mass of the whole mixed powder.

A method for manufacturing a sliding member according to a fifteenth aspect of an embodiment is the method for manufacturing a sliding member according to any aspect of the sixth to fourteenth aspects, wherein the first powder further contains P.

A method for manufacturing a sliding member according to a sixteenth aspect of an embodiment is the method for manufacturing a sliding member according to any aspect of the sixth to fifteenth aspects, wherein the contents of the constituent elements in the hard particle powder are Si: 3 to 7% by mass, Fe: 2 to 16% by mass, Mo: 24 to 28% by mass, Co: 14 to 20% by mass, Cr: 1 to 10% by mass, Sn: 1 to 15% by mass, and Cu: the balance, per 100% by mass of the whole hard particle powder.

A method for manufacturing a sliding member according to a seventeenth aspect of an embodiment is the method for manufacturing a sliding member according to any aspect of the tenth to fourteenth aspects, wherein the contents of the constituent elements in the second powder are Co: 0.6 to 4.6% by mass, Fe: 1.6 to 5.6% by mass, Ni: 10 to 14% by mass, Si: 0.5 to 4.5% by mass, Cr: 0.5 to 1.5% by mass, Sn: 1 to 15% by mass, and Cu: the balance, per 100% by mass of the whole second powder.

A method for manufacturing a bearing according to an eighteenth aspect of an embodiment has a step of sprinkling a mixed powder on one surface of a metal substrate, the mixed powder having a first powder containing Cu, Sn and Bi and a hard particle powder containing a Laves phase constituted of a composition of Co, Mo and Si, and containing Cu, Si, Fe, Mo, Co, and Cr, a step of sintering the mixed powder sprinkled on the metal substrate at 800 to 900° C. to form a sliding layer, a step of rolling the metal substrate having the sliding layer formed thereon, and a step of processing the rolled metal substrate into a wound bush shape with the sliding layer on an inside.

A method for manufacturing a bearing according to a nineteenth aspect of an embodiment is the method for manufacturing a bearing according to the eighteenth aspect, wherein the contents of the constituent elements in the hard particle powder are Si: 3 to 7% by mass, Fe: 2 to 16% by mass, Mo: 24 to 28% by mass, Co: 14 to 20% by mass, Cr: 1 to 10% by mass, Sn: 1 to 15% by mass, and Cu: the balance, per 100% by mass of the whole hard particle powder.

A method for manufacturing a bearing according to a twentieth aspect of an embodiment is the method for manufacturing a bearing according to the eighteenth or nineteenth aspect, wherein the mixed powder further has a second powder containing Cu, Co, Fe, Ni, Si, and Cr.

A method for manufacturing a bearing according to a twenty-first aspect of an embodiment is the method for manufacturing a bearing according to the twentieth aspect, wherein the contents of the constituent elements in the second powder are Co: 0.6 to 4.6% by mass, Fe: 1.6 to 5.6% by mass, Ni: 10 to 14% by mass, Si: 0.5 to 4.5% by mass, Cr: 0.5 to 1.5% by mass, Sn: 1 to 15% by mass, and Cu: the balance, per 100% by mass of the whole second powder.

A mixed powder according to a twenty-second aspect of an embodiment contains a first powder containing Cu and Sn, a hard particle powder containing a Laves phase constituted of a composition of Co, Mo, and Si and further containing Sn at 1% by mass or more, and a second powder containing Cu, Co, Fe, Ni, Si, and Cr, and further containing Sn at 1% by mass or more.

A mixed powder according to a twenty-third aspect of an embodiment is the mixed powder according to the twenty-second aspect, wherein the contents of the constituent elements in the hard particle powder are Si: 3 to 7% by mass, Fe: 2 to 16% by mass, Mo: 24 to 28% by mass, Co: 14 to 20% by mass, Cr: 1 to 10% by mass, Sn: 1 to 15% by mass, and Cu: the balance, per 100% by mass of the whole hard particle powder.

A mixed powder according to a twenty-fourth aspect of an embodiment is the mixed powder according to the twenty-second or twenty-third aspect, wherein the contents of the constituent elements in the second powder are Co: 0.6 to 4.6% by mass, Fe: 1.6 to 5.6% by mass, Ni: 10 to 14% by mass, Si: 0.5 to 4.5% by mass, Cr: 0.5 to 1.5% by mass, Sn: 1 to 15% by mass, and Cu: the balance, per 100% by mass of the whole second powder.

A hard particle powder for a bearing according to a twenty-fifth aspect of an embodiment contains a Laves phase constituted of a composition of Co, Mo, and Si, and further contains Sn at 1% by mass or more.

A hard particle powder for a bearing according to a twenty-sixth aspect of an embodiment is the hard particle powder for a bearing according to the twenty-fifth aspect, wherein the contents of the constituent elements in the hard particle powder for a bearing are Si: 3 to 7% by mass, Fe: 2 to 16% by mass, Mo: 24 to 28% by mass, Co: 14 to 20% by mass, Cr: 1 to 10% by mass, Sn: 1 to 15% by mass, and Cu: the balance, per 100% by mass of the whole hard particle powder.

A powder for a bearing according to a twenty-seventh aspect of an embodiment contains Cu, Co, Fe, Ni, Si, and Cr, and further contains Sn at 1% by mass or more.

A powder for a bearing according to a twenty-eighth aspect of an embodiment is the powder for a bearing according to the twenty-seventh aspect, wherein the contents of the constituent elements in the powder for a bearing are Co: 0.6 to 4.6% by mass, Fe: 1.6 to 5.6% by mass, Ni: 10 to 14% by mass, Si: 0.5 to 4.5% by mass, Cr: 0.5 to 1.5% by mass, Sn: 1 to 15% by mass, and Cu: the balance, per 100% by mass of the whole powder.

A hard particle powder according to a twenty-ninth aspect of an embodiment contains a Laves phase constituted of a composition of Co, Mo, and Si, wherein the contents of the constituent elements in the hard particle powder are Co: 14 to 20% by mass, Mo: 24 to 28% by mass, Si: 3 to 7% by mass, Fe: 2 to 16% by mass, Cr: 1 to 10% by mass, Sn: 48 by mass or more, and Cu: the balance, per 100% by mass of the whole hard particle powder.

Hereinafter, specific examples of embodiments will be described in detail with reference to the attached drawings.

The same sign is used for portions that can be constituted in the same way in the following description and the drawings used in the following description, and duplicated description is omitted.

<Configuration of Sliding Member>

FIG. 1 is a longitudinal section showing a schematic configuration of a sliding member 1 according to one embodiment. As shown in FIG. 1, the sliding member 1 comprises a metal substrate 2 and a sliding layer 3 formed on a surface that is one surface of the metal substrate 2.

Among these, as long as the material of the metal substrate 2 has such strength and shape stability as to be used as a back metal base material of a bearing, the material of the metal substrate 2 is not particularly limited, but may be, for example, low-carbon steel (SPCC, SS400, or the like) or a copper-plated steel plate, in which a Fe-based plate material is plated with Cu.

Figure 2:
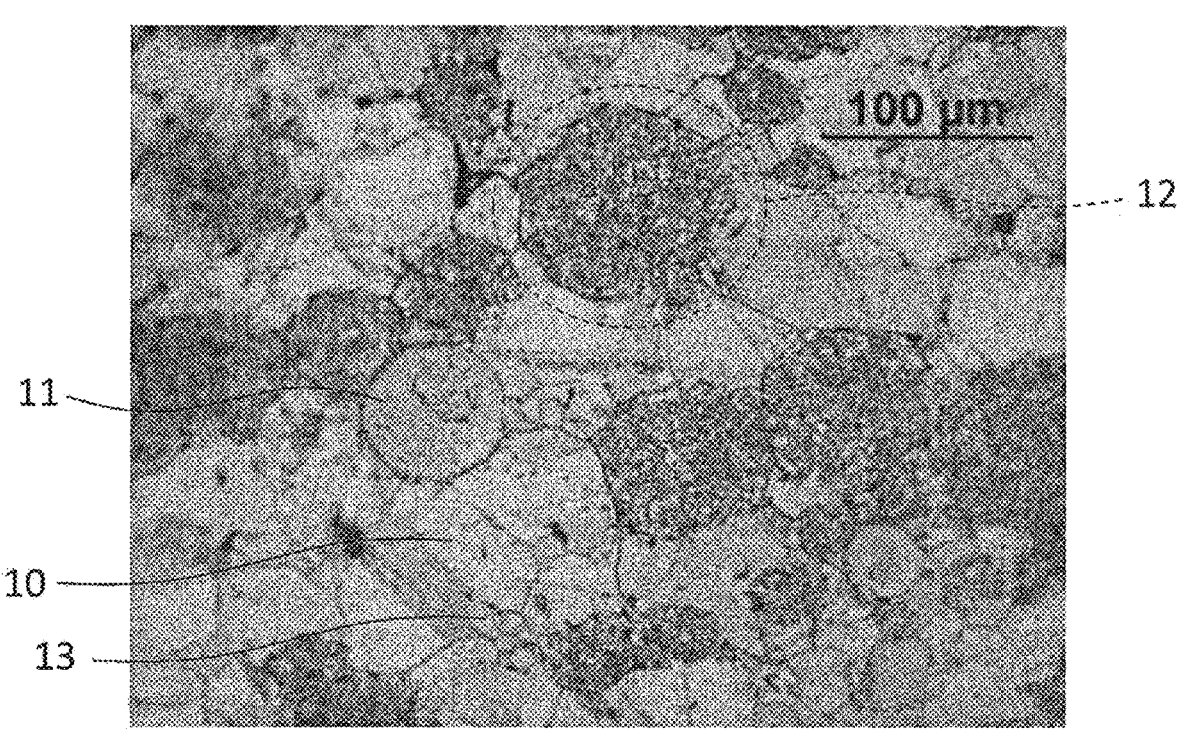
FIG. 2 is an optical micrograph of a sectional structure of the sliding layer of a sliding member according to one embodiment.
Figure 3:
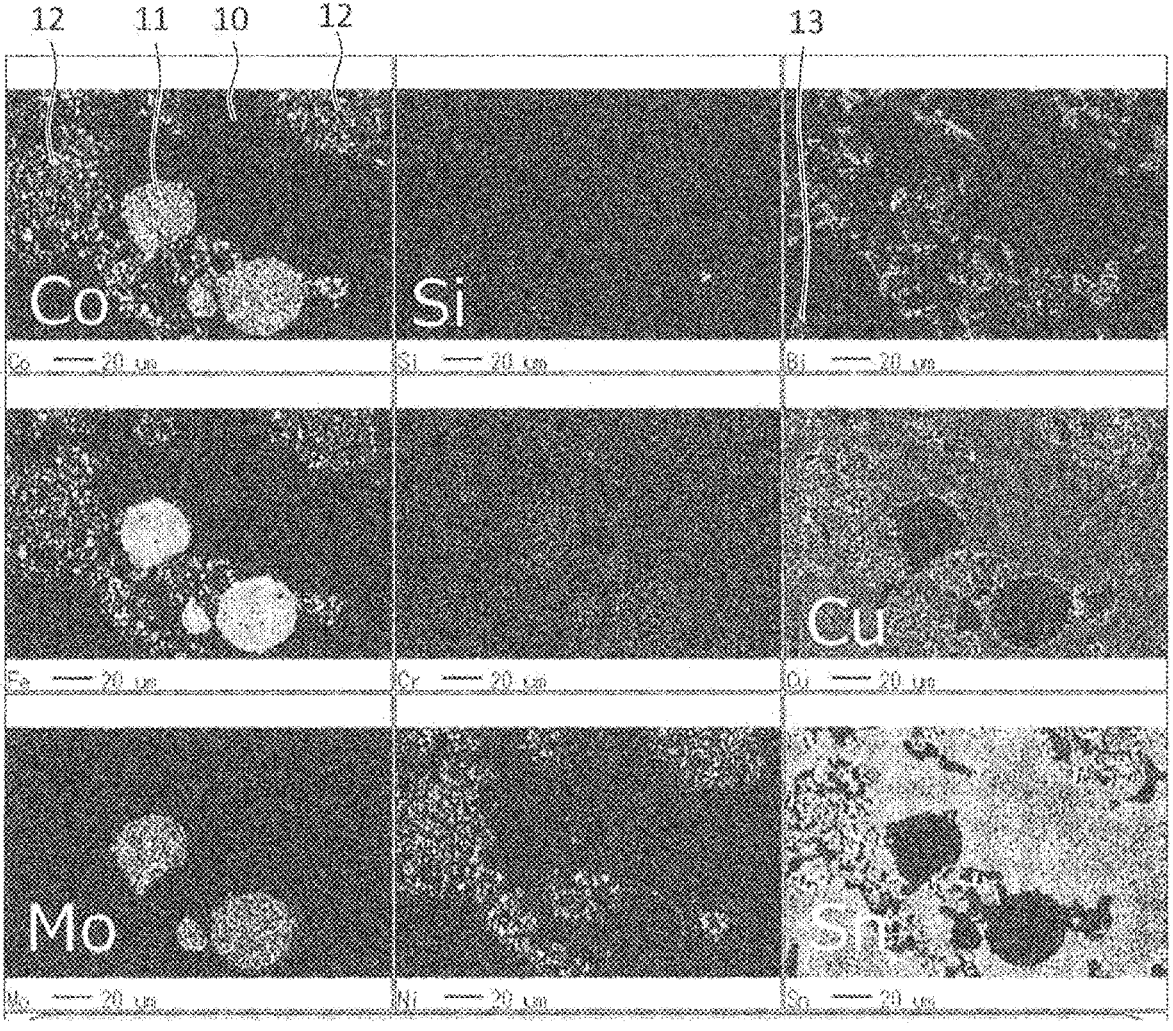
FIG. 3 shows mapping images of sectional structures of the sliding layer of a sliding member according to one embodiment by EPMA.

Metal powder (mixed powder described below) is sintered on the surface of the metal substrate 2 to form the sliding layer 3. For example, the thickness of the sliding layer 3 may be 0.3 mm or less. FIG. 2 is an optical micrograph of a sectional structure of the sliding layer 3 corroded with ferric chloride. FIG. 3 is mapping images of sectional structures of the sliding layer 3 by an electron probe microanalyzer (EPMA).

As shown in FIGS. 2 and 3, the sliding layer 3 has a matrix phase 10 containing Cu and Sn and hard particles 11 dispersed in the matrix phase 10.

Among these, the matrix phase 10 is a bronze-based alloy containing Cu as the main ingredient and further containing Sn. As shown in FIG. 3, the matrix phase 10 may be constituted of a solid solution of Cu, Sn, and Ni.

As shown in FIGS. 2 and 3, Bi particles may be distributed on the crystal grain boundary of the matrix phase 10. In this case, when Bi exhibits self-lubrication action in the same way as Pb of the conventional lead bronze, and functions as a lubricant between two surfaces to be rubbed, the friction can be reduced.

Figure 4:
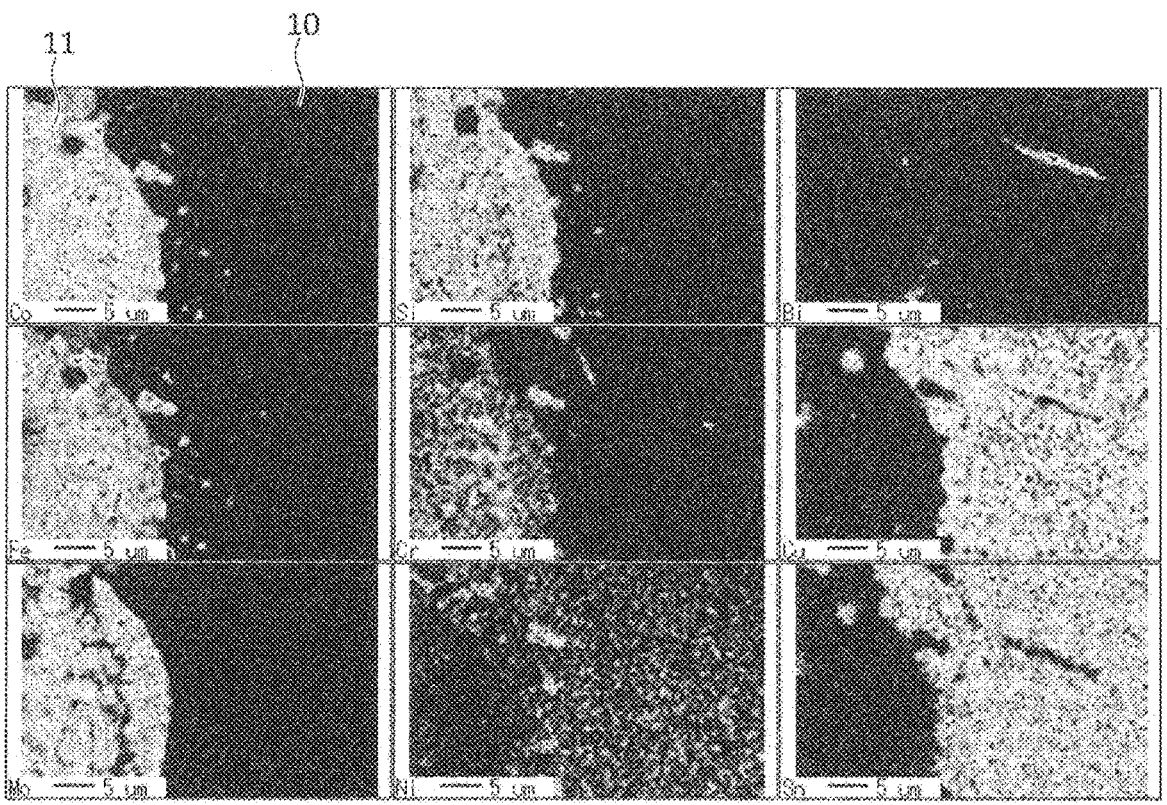
FIG. 4 shows mapping images of hard particle portions in a sectional structure of the sliding layer of a sliding member according to one embodiment by EPMA.

FIG. 4 is mapping images of hard particle 11 portions in a sectional structure of the sliding layer 3 by EPMA. As shown in FIG. 4, hard particles 11 contain a Laves phase constituted of a composition of Co, Mo, and Si. Here, the Laves phase is an intermetallic compound based on an AB2 type wherein the AB2 type comprises an A element and a B element, and the atom radius ratio A to B is around 1.2:1, and includes three structures, namely a $MgZn_2$ (C14) type, a $MgCu_2$ (C15) type, and a $MgNi_2$ (C36) type. The Laves phase constituted of a composition of Co, Mo, and Si (more specifically, $Co_3Mo_2Si$) is a Laves phase in which the A element is Mo, the B element is Co, and 25 at % of the Co is substituted with Si, and is of the $MgZn_2$ type, having a hexagonal crystal structure. The Vickers hardness of the Laves phase constituted of $Co_3Mo_2Si$ is 1000 to 1200 Hv.

As shown in FIGS. 2 and 3, the hard particles 11 are distributed on the crystal grain boundary of the matrix phase 10. It is believed that the hard particles 11 dispersed in the matrix phase 10 receive a higher load than soft bronze that is the matrix phase 10. When the hard Laves phase constituted of a composition of Co, Mo, and Si is deposited on the frictional surface, and supports the load, the hard particles can however act on a reduction in the abrasion of the sliding layer 3 advantageously.

In the present embodiment, Mo in the Laves phase and S in lubricating oil can form a sulfide film of $MoS_2$ on the frictional surfaces. $MoS_2$ is a material known as a sulfide that contributes to improvement in frictional characteristics instead of the solid lubricity of lead. Since a bond between sulfur atoms is weaker than a bond between molybdenum atoms and a bond between a molybdenum atom and a sulfur atom, friction selectively cleaves bonds between sulfur atoms, this leads to lubrication, which can act on abrasion suppression effectively. A Mo oxide generated on the frictional surface by the oxidation of Mo in the Laves phase during the sliding also exhibits a lubrication effect, and can act on abrasive suppression effectively.

The content of the hard particles 11 may be, for example, 40% by mass or less per 100% by mass of whole sliding layer 3. The content of the hard particles 11 may be, for example, 0.1% by mass or more per 100% by mass of whole sliding layer 3. If the content of the hard particles 11 is 0.1% by mass or more, the effect of reducing the abrasion of the sliding layer 3 as described above is obtained. The content of the Laves phase constituted of a composition of Co, Mo, and Si may be, for example, 0.1 to 20% by mass per 100% by mass of whole sliding layer 3.

As shown in FIGS. 2 and 3, the sliding layer 3 may further have compound phases 12 dispersed in the matrix phase 10. The Compound phases 12 contain Co, Fe, Ni, Si, and Cr. The formation the compound phases 12 in the matrix phase 10 enables enhancing the hardness of the matrix phase 10, and enables acting on improvement in the seizure resistance advantageously.

<Configuration of Bearing>

Figure 5:
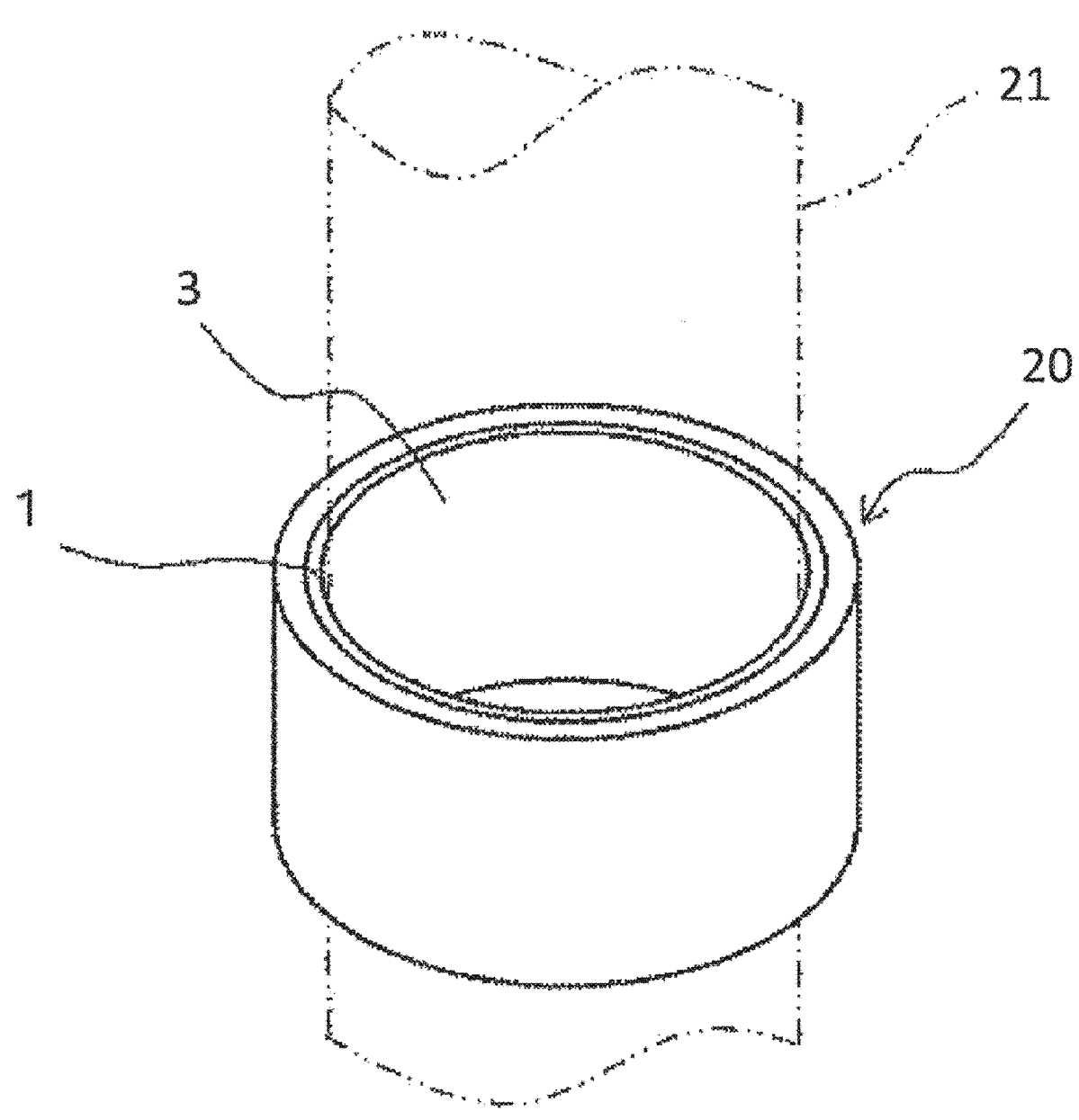
FIG. 5 is a perspective view showing a schematic configuration of a bearing according to one embodiment.

Then, the configuration of a bearing 20 according to one embodiment will be described. FIG. 5 is a perspective view showing the schematic configuration of the bearing 20 according to one embodiment. As shown in FIG. 5, for example, the bearing 20 is a plain bearing, and is constituted in an annular shape with the sliding layer 3 of the sliding member 1 having the configuration described above on an inside. The bearing 20 supports a shaft 21 that is an object to be slid in the sliding layer 3 forming a cylindrical inner periphery.

Even though the shaft 21 has either a form that moves rotationally or a form that moves linearly, the bearing 20 is applicable. For example, the bearing 20 may be used for sliding portions of shock absorbers and the like for cars and the like having forms that move linearly and using oil. The bearings 20 may be used for sliding portions of gear pumps, which send out oil by rotating gear-formed members, having forms that move rotationally and using oil. Examples of another form of the bearing according to the present embodiment also include rolling bearings to be used in transmissions and the like.

<Method for Manufacturing Sliding Member and Bearing>

Figure 6:
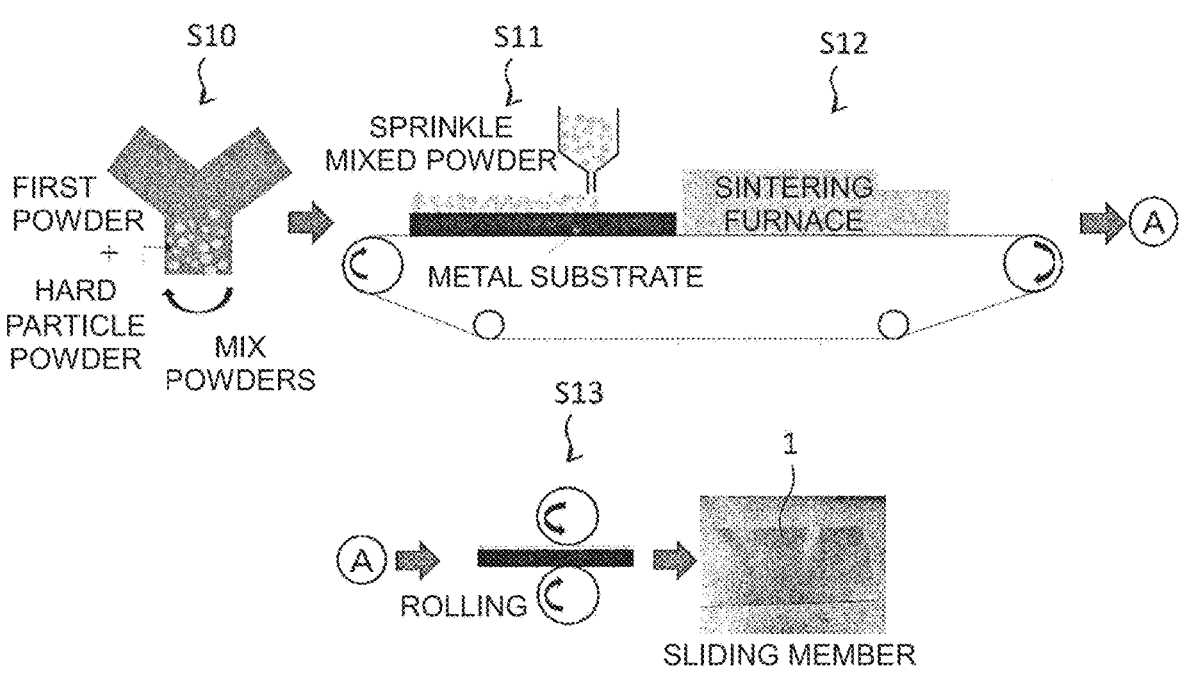
FIG. 6 shows a process for manufacturing a sliding member according to one embodiment.

Then, a method for manufacturing a sliding member 1 and a bearing 20 according to the present embodiment will be described with reference to FIG. 6. FIG. 6 is a figure showing a process for manufacturing the sliding member 1.

As shown in FIG. 6, a first powder containing Cu and Sn and a hard particle powder containing a Laves phase constituted of a composition of Co, Mo, and Si are first mixed to produce mixed powder (step S10). A second powder containing Cu, Co, Fe, Ni, Si, and Cr may be further mixed in addition to the first powder and the hard particle powder to produce mixed powder.

Here, the first powder is a bronze-based alloy powder containing Cu as the main ingredient and further containing Sn. The first powder may further contain Bi or P. If the first powder contains Bi, Bi particles are deposited in a matrix phase 10 at the time of the sintering of the mixed powder described below (namely, step S12), Bi exhibits self-lubrication action in the same way as Pb in the conventional lead bronze, friction can therefore be reduced. If the first powder contains P, oxygen contained in copper can be removed (deoxidized) to suppress hydrogen embrittlement. The contents of the constituent elements of the first powder may be Sn: 10 to 11% by mass and Cu: the balance. If the first powder further contains Bi, Bi: 7 to 9% by mass. If the first powder contains P, it is preferable that P: 0.02% by mass or less. The amount of the first powder blended in the mixed powder is the amount of the balance obtained by deducting the total amount of powders blended other than the first powder from the amount of the whole mixed powder blended.

The hard particle powder is an alloy powder containing a Laves phase constituted of a composition of Co, Mo, and Si and Cu, and is a hard particle powder containing Cu, Si, Fe, Mo, Co and Cr. The hard particle powder may further contain Sn, and for example, may contain Sn at 1% by mass or more, or may contain Sn at 4% by mass or more. The solid phase temperature of the hard particle powder not containing Sn reaches around 1450° C., but the incorporation of Sn enables reducing the solid phase temperature of the hard particle powder, and enables solid phase-sintering the hard particle powder on a back metal base material at around 800° C. Sn contained in the hard particle powder is dissolved on a Cu—Sn matrix phase 10 side formed by the first powder for diffusion bonding at the time of sintering. The progress of the sintering due to the powdery shrinkage through Sn enables exhibiting solid solution strengthening by Sn in the matrix phase 10 and Sn contained in the hard particle powder. The contents of the constituent elements in the hard particle powder may be Co: 14 to 20% by mass, Mo: 24 to 28% by mass, Si: 3 to 7% by mass, Fe: 2 to 16% by mass, Cr: 1 to 10% by mass, and Cu: the balance, per 100% by mass of the whole hard particle powder. If the hard particle powder contains Sn, the contents of the constituent elements in the hard particle powder may be Co: 14 to 20% by mass, Mo: 24 to 28% by mass, Si: 3 to 7% by mass, Fe: 2 to 16% by mass, Cr: 1 to 10% by mass, Sn: 1 to 15% by mass, and Cu: the balance with the content of the whole hard particle powder defined as 100% by mass. The amount of the hard particle powder blended may be 1 to 40% by mass, and is preferably 1 to 3% by mass, per 100% by mass of the whole mixed powder (namely, 100% by mass of the whole sliding layer 3). Since Cu and Sn are molten out of the hard particle powder during the sintering, the content of the hard particles 11 in the sliding layer 3 varies from the amount of the hard particle powder blended in the mixed powder.

The second powder is an alloy powder containing Cu as the main ingredient and further containing Co, Fe, Ni, Si, and Cr. The second powder may further contain Sn, and, for example, may contain Sn at 1% by mass or more, or contain Sn at 4% by mass or more. The solid phase temperature of the second powder not containing Sn reaches around 1240° C., but the incorporation of Sn enables reducing the solid phase temperature of the second powder, and enables solid phase-sintering the second powder on the back metal base material at around 800° C. If the second powder contains Sn, the contents of the constituent elements in the second powder may be Co: 0.6 to 4.6% by mass, Fe: 1.6 to 5.6% by mass, Ni: 10 to 14% by mass, Si: 0.5 to 4.5% by mass, Cr: 0.5 to 1.5% by mass, Sn: 1 to 15% by mass, and Cu: the balance with the content of the whole second powder defined as 100% by mass. If the second powder is contained in mixed powder, the amount of the second powder blended may be 2 to 38% by mass, and is preferably 10 to 38% by mass and more preferably 17 to 19% by mass with the content of the whole mixed powder defined as 100% by mass.

The amount of the hard particle powder blended is 1 to 40% by mass, and the amount of the second powder blended may be 15 to 18% by mass, per 100% by mass of the whole mixed powder. In this case, excellent shearing workability can be achieved.

The first powder, the hard particle powder, and the second powder can each be produced, for example, by spraying using gas atomization. In the gas atomization, the heat source for melting may be high-frequency waves, and zirconia may be used for the crucible (with a nozzle attached to the bottom).

For example, the grain diameter of the first powder may be 45 μm to 180 μm. For example, the grain diameter of the hard particle powder may be 53 μm to 180 μm. The grain diameter of the second powder may be 53 μm to 150 μm. Here, the "grain diameter" refers to particle size distribution measured by laser diffraction/scattering using the particle size distribution measuring apparatus MT3300EXII, manufactured by MicrotracBEL Corp. This measuring method is a measuring method according to the test procedure including the step of extracting powder from paste and the following in "4.2.3 Laser diffraction grain size distribution measurement test" of JIS Z3284-2.

As shown in FIG. 6, mixed powder containing the first powder and the hard particle powder is then sprinkled on one surface of the metal substrate (step S11). The mixed powder may contain the second powder. The mixed powder sprinkled on the metal substrate is sintered at 800 to 900° C. to form a sliding layer (step S12). As described above, the solid phase temperatures of the hard particle powder not containing Sn and the second powder reach around 1450° C. and 1240° C., respectively, but the incorporation of Sn enables reducing the solid phase temperatures of the hard particle powder and the second powder, and enables solid phase-sintering the hard particle powder and the second powder on the metal substrate (back metal base material) at around 800° C. Sn contained in the hard particle powder is dissolved in the Cu—Sn matrix phase 10 side formed by the first powder during sintering for diffusion bonding. The progress of the sintering due to powdery shrinkage through Sn exhibits solid solution strengthening by Sn in matrix phase 10 and Sn contained in the hard particle powder, and enables forming an alloy having high strength finally.

As shown in FIG. 6, the metal substrate having the sliding layer formed thereon is then rolled (step S13). The sliding member 1 having the configuration described above (refer to FIG. 1 to FIG. 4) is manufactured thereby. A bearing 20 having the configuration described above (refer to FIG. 5) is manufactured by then processing the rolled metal substrate (sliding member 1) into a wound bush shape with the sliding layer on an inside.

EXAMPLES

Specific examples according to the present embodiment will then be described.

(Manufacturing of Specimen)

The present inventors first produced samples of first powder, hard particle powder, and second powder at mass ratios between chemical components shown in the following table 1 by spraying using gas atomization, respectively. That is, the sample of the first powder is constituted of a composition in which the content of Sn is 10% by mass, the content of Bi is 8% by mass, and the content of Cu is the balance. The sample of the hard particle powder is constituted of a composition in which the content of Sn is 4.5% by mass, the content of Si is 5% by mass, the content of Fe is 15% by mass, the content of Mo is 26% by mass, the content of Co is 16% by mass, the content of Cr is 4% by mass, and the content of Cu is the balance. The sample of the second powder is constituted of a composition in which the content of Sn is 7.8% by mass, the content of Ni is 12% by mass, the content of Si is 2.5% by mass, the content of Fe is 3.6% by mass, the content of Co is 2.6% by mass, the content of Cr is 1% by mass, and the content of Cu is the balance. The solid phase temperatures of the samples of the first powder, the hard particle powder, and the second powder were 800° C., 790° C., and 883° C. from the measurement results by differential scanning calorimetry (DSC), respectively.

TABLE 1

| Chemical components of powders | | | |
|---|---|---|---|
| Chemical component | First powder (% by mass) | Hard particle powder (% by mass) | Second powder (% by mass) |
| Cu | Bal | 29.5 | 70.5 |
| Sn | 10 | 4.5 | 7.8 |
| Bi | 8 | — | — |
| Ni | — | — | 12 |
| Si | — | 5 | 2.5 |
| Fe | — | 15 | 3.6 |
| Mo | — | 26 | — |
| Co | — | 16 | 2.6 |
| Cr | — | 4 | 1 |
| Melting point (° C.) | 800 | 790 | 883 |

Specimens of Examples 1 to 18 and Comparative Example 2 were then manufactured in the following procedure. That is, the samples of the first powder, the hard particle powder, and the second powder were mixed at blending ratios shown in the following Table 2 to produce mixed powders. Here, the sample of the second powder with a grain size under 105 μm and the sample of the hard particle powder with a grain size of 53 μm to 105 μm produced by grain size adjustment were used.

Each of these mixed powders was sprinkled on the back metal base material SS400, sintered at a primary sintering temperature of 850° C. for a sintering time of 60 minutes, and rolled at a primary rolling reduction of 7.7±0.2% for densifying the sintered structure. Then, the mixed powder was secondarily sintered at 850° C. and rolled with the secondary rolling reduction adjusted to 2.9±0.4% so that the thickness of the finished alloy was 0.8±0.2 mm, and the specimens of Examples 1 to 18 and Comparative Example 2 were manufactured.

LBC3 was sintered on the back metal base material SS400 and then rolled in the same way to manufacture the specimen of Comparative Example 1.

TABLE 2

| Blending ratio between powders | | | |
|---|---|---|---|
| | First powder (% by mass) | Second powder (% by mass) | Hard particle powder (% by mass) |
| Example 1 | 60 | 38 | 2 |
| Example 2 | 70 | 28 | 2 |
| Example 3 | 80 | 18 | 2 |
| Example 4 | 90 | 8 | 2 |
| Example 5 | 98 | 0 | 2 |
| Example 6 | 60 | 30 | 10 |
| Example 7 | 60 | 20 | 20 |

TABLE 2-continued

Blending ratio between powders

| | First powder (% by mass) | Second powder (% by mass) | Hard particle powder (% by mass) |
|---|---|---|---|
| Example 8 | 60 | 10 | 30 |
| Example 9 | 60 | 0 | 40 |
| Example 10 | 70 | 20 | 10 |
| Example 11 | 70 | 10 | 20 |
| Example 12 | 70 | 0 | 30 |
| Example 13 | 80 | 15 | 5 |
| Example 14 | 80 | 10 | 10 |
| Example 15 | 80 | 5 | 15 |
| Example 16 | 80 | 0 | 20 |
| Example 17 | 90 | 5 | 5 |
| Example 18 | 90 | 0 | 10 |
| Comparative Example 1 (LBC3) | — | — | — |
| Comparative Example 2 | 60 | 40 | 0 |

In the specimens of Examples 1 to 18, the amount of the hard particle powder blended is 1% by mass or more, specifically 2 to 40% by mass, per 100% by mass of the whole mixed powder. This is equivalent to the fact that the content of the hard particle 11 is 40% by mass or less per 100% by mass of the whole sliding layer 3.

(Evaluation Test)

Then, the specimens of Examples 1 to 18 and Comparative Example 2 were measured for the Vickers hardnesses of the matrix phase portions. The following Table 3 shows the measurement results in the column of "Bronze portion hardness". The specimens of the Examples 1 to 18 and the Comparative Examples 1 and 2 were subjected to a frictional abrasion test and a shearing test described below.

(a) Frictional Abrasion Test

This evaluation is for comparing the seize resistances and the abrasion resistances of the specimens. This evaluation is an evaluation test in oil, but belongs to an evaluation in a boundary lubrication environment in which an oil film is hardly actually formed since a cylindrical ring and the bearing metal are in full sliding contact without any space therebetween.

Figure 7:
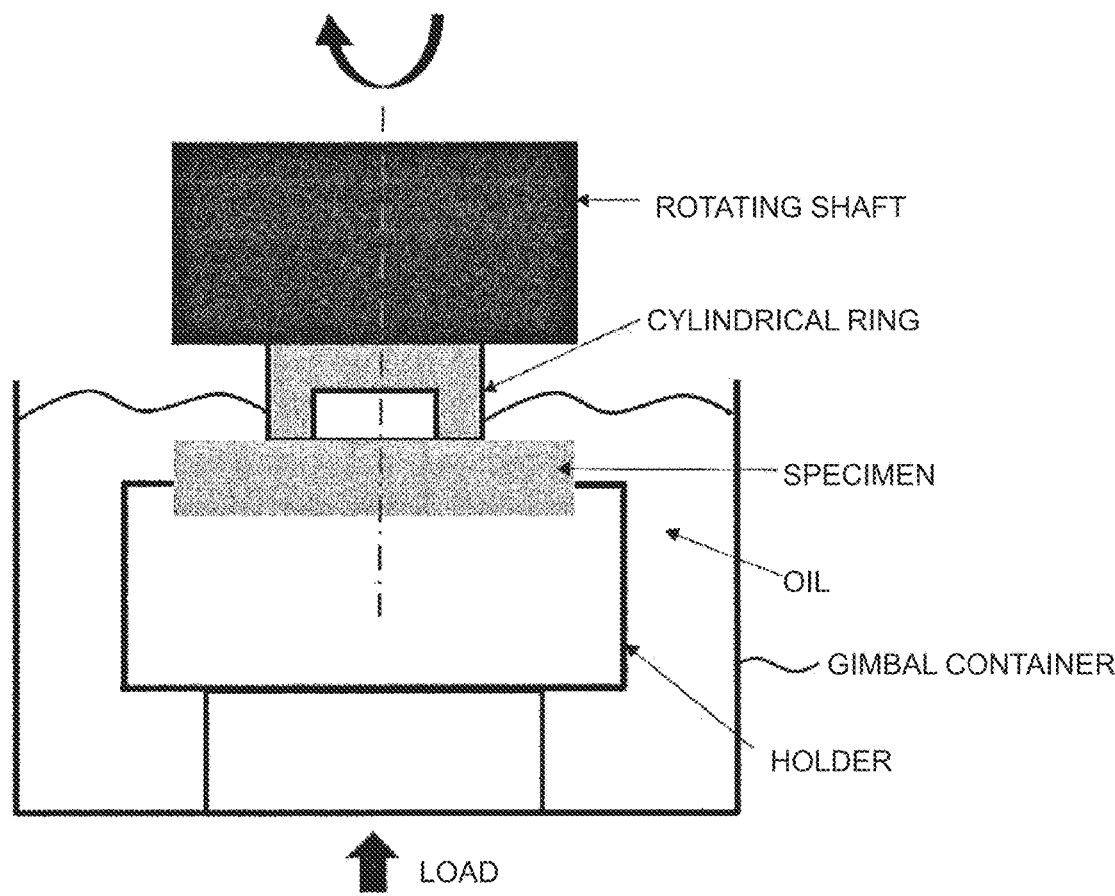
FIG. 7 shows a summary of a frictional abrasion test.

A thrust tester shown in FIG. 7 was used in this evaluation. A hydraulic fluid (Trade name: VG32) was used as the oil to be used. The amount of oil in a gimbal container was 250 cc, the opposite cylindrical ring having an outer diameter of φ30 and inner diameter of φ24 and made of the material SCM435. The surface roughness of the opposite material Ra was 0.04 μm, and the bearing alloy was subjected to finish polishing so that the surface roughness of the bearing alloy Ra was 0.5 μm.

A seizure test was performed at a circumferential speed of 0.2 m/s under a step load of 0.6 MPa/30 s. A value obtained by dividing a load when the coefficient of friction reached 0.5 or when the temperature on the rear side of the specimen reached 200° C. by the friction cross-sectional area, namely 254 mm², was defined as seizure surface pressure. The following Table 3 shows the measurement results in the column "Seizure surface pressure". In the following Table 3, a specimen having a seizure surface pressure of 25 MPa or more was evaluated as "○", and a specimen having a seizure surface pressure of less than 25 MPa was evaluated as "X".

In the abrasion test, the abrasion depth 10 hours after continuous operation under the constant conditions of a circumferential speed of 1.0 m/s and a surface pressure of 2.5 MPa was measured, and the specific abrasion loss (abrasion loss per unit time) was calculated. The following Table 3 shows the measurement results in the column "Specific abrasion loss". In the following Table 3, a specimen having a specific abrasion loss of less than 0.001 mm/hr was evaluated as "○", and a specimen having a specific abrasion loss of 0.001 mm/hr or more was evaluated as "X".

(b) Shearing Test

Figure 8:
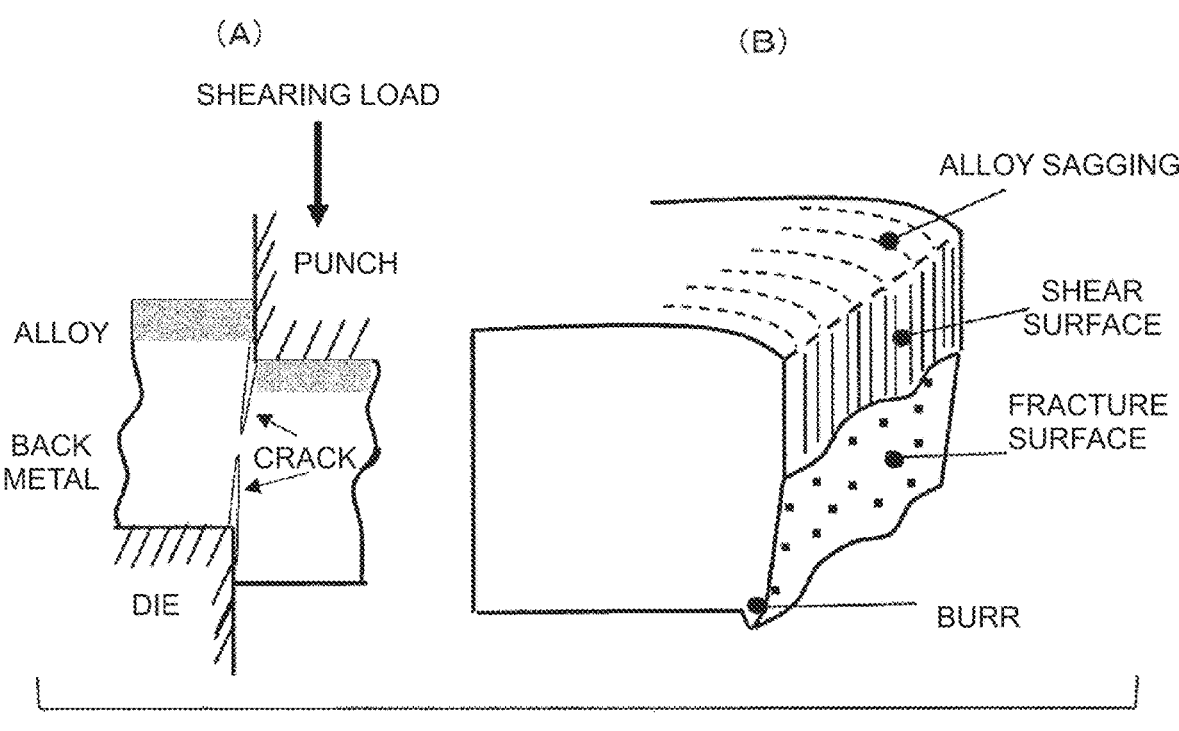
FIG. 8 shows a summary of a shearing test.

When a sliding member is formed into a product, the sliding member needs to be subjected to processing such as slitting and rounding after the sintering of the materials and finally processed into a bush shape. As evaluation substituted therefor, shearing (shearing test) from the alloy side (the sliding layer side) was performed by a method shown in FIG. 8, and the conditions of the alloy breakage on the shear surface were observed. Here, the layer thickness after the secondary rolling of the specimen is 5.5±0.03 mm, the lining thickness is 0.8±0.2 mm. The surface of the shear portion was observed through a microscope, and the fracture surface was observed through an optical microscope.

TABLE 3

Influence of blending ratio between powders on seizure resistance performance

| | First powder (% by mass) | Second powder (% by mass) | Hard particle powder (% by mass) | Bronze portion hardness Hv | Specific abrasion loss (mm/hr) less than 0.001: ○ 0.001 or more: X | | Seizure surface pressure (MPa) 25 or more: ○ less than 25: X | |
|---|---|---|---|---|---|---|---|---|
| Example 1 | 60 | 38 | 2 | 146.2 | 0.000163 | ○ | 32.8 | ○ |
| Example 2 | 70 | 28 | 2 | 143.6 | 0.000192 | ○ | 32.2 | ○ |
| Example 3 | 80 | 18 | 2 | 138.1 | 0.000225 | ○ | 37.0 | ○ |
| Example 4 | 90 | 8 | 2 | 112.5 | 0.00092 | ○ | 19.5 | X |
| Example 5 | 98 | 0 | 2 | 107.3 | 0.000586 | ○ | 23.1 | X |
| Example 6 | 60 | 30 | 10 | 128.8 | 0.000962 | ○ | 28.3 | ○ |
| Example 7 | 60 | 20 | 20 | 110.2 | 0.00015 | ○ | 42.4 | ○ |
| Example 8 | 60 | 10 | 30 | 107.5 | 0.000893 | ○ | 36.9 | ○ |
| Example 9 | 60 | 0 | 40 | 97.6 | 0.000362 | ○ | 43.3 | ○ |
| Example 10 | 70 | 20 | 10 | 120.3 | 0.000212 | ○ | 34 | ○ |
| Example 11 | 70 | 10 | 20 | 108.7 | 0.000113 | ○ | 33.7 | ○ |
| Example 12 | 70 | 0 | 30 | 108.6 | 0.0001 | ○ | 34.6 | ○ |
| Example 13 | 80 | 15 | 5 | 127.1 | 0.000545 | ○ | 32.8 | ○ |
| Example 14 | 80 | 10 | 10 | 122.8 | 0.000138 | ○ | 37.3 | ○ |
| Example 15 | 80 | 5 | 15 | 111.5 | 0.000329 | ○ | 34.6 | ○ |
| Example 16 | 80 | 0 | 20 | 119.7 | 0.000212 | ○ | 36.4 | ○ |
| Example 17 | 90 | 5 | 5 | 106.6 | 0.000237 | ○ | 33.4 | ○ |

TABLE 3-continued

| | First powder (% by mass) | Second powder (% by mass) | Hard particle powder (% by mass) | Bronze portion hardness Hv | Specific abrasion loss (mm/hr) less than 0.001: ◯ 0.001 or more: X | | Seizure surface pressure (MPa) 25 or more: ◯ less than 25: X | |
|---|---|---|---|---|---|---|---|---|
| | | | | Influence of blending ratio between powders on seizure resistance performance | | | | |
| Example 18 | 90 | 0 | 10 | 109.4 | 0.00018 | ◯ | 35.5 | ◯ |
| Comparative Example 1 (L8C3) | — | — | — | — | 0.002 | X | 21 | X |
| Comparative Example 2 | 60 | 40 | 0 | 125.7 | 0.001071 | X | 32.2 | ◯ |

Results and Discussion

Table 3 shows the results of measuring the specimens of the Examples 1 to 18 and the Comparative Examples 1 and 2 for the Vickers hardness of the matrix phase portion, the specific abrasion loss, and the seizure surface pressure.

The specimens of Examples 1 to 18 are specimens in which the mixed powders containing the first powder and the hard particle powder are sintered to form the sliding layers, that is, specimens in which hard particles containing Laves phases constituted of compositions of Co, Mo, and Si are dispersed in the sliding layers. The sliding layers of the specimens of Examples 1 to 18 contain Sn, Bi, Cu, Si, Fe, Mo, Co, and Cr. The sliding layers of the specimens of Examples containing the second powder further contain Ni. Meanwhile, the specimen of Comparative Example 1 is a specimen in which LBC3 is sintered to form the sliding layer, and the specimen of Comparative Example 2 is a specimen in which the mixed powder not containing the hard particle powder is sintered to form the sliding layer, and both specimens are specimens not having hard particles containing a Laves phase constituted of a composition of Co, Mo, and Si in the sliding layer.

As understood from the Table 3, while the specific abrasion losses of the specimens of Examples 1 to 18 are evaluated as "◯", the specific abrasion losses of the specimens of Comparative Examples 1 and 2 are evaluated as "X". The specimens of Examples 1 to 18 decrease in the specific abrasion loss as compared with the specimens of Comparative Examples 1 and 2. It can be said from this that when the sliding layer of the sliding member has the hard particles containing the Laves phase constituted of a composition of Co, Mo, and Si, more excellent abrasion resistance can be achieved than LBC3.

The specimens of Examples 1 to 5 have the same amount of the hard particle powder blended, but have different amounts of the second powder blended. That is, the specimens have the same amount of the hard particles contained in the sliding layer, but have different amounts of the compound phases.

As understood from Table 3, as the amount of the second powder blended increases in the specimens of Examples 1 to 5, the Vickers hardness of the matrix phase portion increases. While the seizure resistances of the specimens of Examples 4 and 5 in which the amounts of the second powder blended are less than 10% by mass are evaluated as "X", the seizure resistances of the specimens of Examples 1 to 3 in which the amounts of the second powder blended are 10% by mass or more are evaluated as "◯". It can be said from this that when the sliding layer of the sliding member has compound phases containing Co, Fe, Ni, Si, and Cr, the hardness of the matrix phase 10 can be enhanced. It can be said that the adjustment of the amount of the second powder blended to 10% by mass or more enables achieving seizure resistance more excellent than LBC3.

In the above-mentioned shearing test, it was confirmed that the specimens of Example 3 and 13 were good in shearing workability as compared with the other specimens, and the specimen of Example 3 particularly hardly broke, and was satisfactorily finished. It can be said from this that the adjustment of the amount of the hard particle powder blended to 2 to 5% by mass and the amount of the second powder blended to 15 to 18% by mass with the content of the whole mixed powder defined as 100% by mass enables achieving excellent shearing workability.

Although the embodiments and the variations were described above by illustration, the scope of the present technology is not limited to these. The embodiments and the variations can be modified and varied depending on the object within the scope described in claims. As long as the treatment contents do not conflict with each other, the embodiments and the variations can be appropriately combined.

The invention claimed is:

1. A mixed powder for sliding surfaces of a sliding member and a bearing, the mixed powder comprising:
   a first powder comprising Cu and Sn;
   a hard particle powder consisting of a Laves phase consisting of Si: 3% to 7% by mass, Fe: 2% to 16% by mass, Mo: 24% to 28% by mass, Co: 14% to 20% by mass, Cr: 1% to 10% by mass, Sn: 1% to 15% by mass, and Cu: the balance, per 100% by mass of the whole hard particle powder; and
   a second powder comprising Cu, Co, Fe, Ni, Si, and Cr and further comprising Sn at 1% by mass or more.

2. The mixed powder according to claim 1,
   wherein contents of constituent elements in the second powder are Co: 0.6% to 4.6% by mass, Fe: 1.6% to 5.6% by mass, Ni: 10% to 14% by mass, Si: 0.5% to 4.5% by mass, Cr: 0.5% to 1.5% by mass, Sn: 1% to 15% by mass, and Cu: the balance, per 100% by mass of the whole second powder.

* * * * *